(12) United States Patent
Gargiulo et al.

(10) Patent No.: US 9,286,049 B2
(45) Date of Patent: Mar. 15, 2016

(54) SYSTEMS, METHODS, AND COMPUTER PROGRAM PRODUCTS FOR MANAGING SERVICE INSTALLATION

(71) Applicant: GOOGLE INC., Mountain View, CA (US)

(72) Inventors: Michael J. Gargiulo, Corinth, TX (US); Florent Hay, Ixelles (BE)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/223,207

(22) Filed: Mar. 24, 2014

(65) Prior Publication Data

US 2014/0298322 A1   Oct. 2, 2014

Related U.S. Application Data (60) Provisional application No. 61/805,413, filed on Mar. 26, 2013, provisional application No. 61/889,405, filed on Oct. 10, 2013.

(51) Int. Cl.
*G06F 9/44* (2006.01)
*G06F 9/445* (2006.01)
*G06F 21/57* (2013.01)

(52) U.S. Cl.
CPC . *G06F 8/61* (2013.01); *G06F 21/57* (2013.01)

(58) Field of Classification Search
USPC .......................................................... 717/175
See application file for complete search history.

(56) References Cited

U.S. PATENT DOCUMENTS

| 5,590,038 | A | 12/1996 | Pitroda | 395/241 |
|---|---|---|---|---|
| 5,640,002 | A | 6/1997 | Ruppert et al. | 235/472 |
| 5,748,740 | A | 5/1998 | Curry et al. | 380/25 |
| 5,805,702 | A | 9/1998 | Curry et al. | 380/24 |
| 5,884,271 | A | 3/1999 | Pitroda | 705/1 |
| 5,901,303 | A | 5/1999 | Chew | 395/400 |

(Continued)

FOREIGN PATENT DOCUMENTS

| CA | 2 381 614 | A1 | 3/2001 |
|---|---|---|---|
| EP | 1 222 503 | A2 | 7/2002 |

(Continued)

OTHER PUBLICATIONS

Int'l Search Report and Written Opinion issued in connection with Int'l Appl'n No. PCT/US2014/031563 on Jul. 11, 2014 (11 pages).

*Primary Examiner* — Marina Lee
(74) *Attorney, Agent, or Firm* — Johnson, Marcou & Isaacs, LLC (57) ABSTRACT

Systems, methods, and computer program products are provided for managing installation of services on a secure element having a secure element profile. A request to install a service on the secure element is received. There is a determination of a preferred version of the service corresponding to the secure element profile of the secure element. There is also a determination of an existing version of the service loaded on the secure element. Using a rules engine, there is a determination of whether to install on the secure element either the existing version of the service or the preferred version of the service. A command is transmitted to either (a) install the existing version of the service or (b) delete the existing version of the service and load and install the preferred version of the service, based on the determination using the rules engine.

22 Claims, 4 Drawing Sheets

(56) References Cited

U.S. PATENT DOCUMENTS

| | | | | |
|---|---|---|---|---|
| 5,940,510 A | 8/1999 | Curry et al. | | 380/25 |
| 5,949,880 A | 9/1999 | Curry et al. | | 380/24 |
| 6,073,840 A | 6/2000 | Marion | | 235/381 |
| 6,105,013 A | 8/2000 | Curry et al. | | 705/65 |
| 6,116,505 A | 9/2000 | Withrow | | 235/381 |
| 6,131,811 A | 10/2000 | Gangi | | 235/380 |
| 6,237,095 B1 | 5/2001 | Curry et al. | | 713/178 |
| 6,422,464 B1 | 7/2002 | Terranova | | 235/384 |
| 6,587,835 B1 | 7/2003 | Treyz et al. | | 705/14 |
| 6,601,759 B2 | 8/2003 | Fife et al. | | 235/375 |
| 6,671,358 B1 | 12/2003 | Seidman et al. | | 379/93.12 |
| 6,732,081 B2 | 5/2004 | Nicholson | | 705/14 |
| 6,769,607 B1 | 8/2004 | Pitroda et al. | | 235/380 |
| 6,813,609 B2 | 11/2004 | Wilson | | 705/14 |
| 6,837,436 B2 | 1/2005 | Swartz et al. | | 235/472.02 |
| 6,925,439 B1 | 8/2005 | Pitroda | | 705/1 |
| 7,083,094 B2 | 8/2006 | Cooper | | 235/449 |
| 7,110,792 B2 | 9/2006 | Rosenberg | | 455/558 |
| 7,127,236 B2 | 10/2006 | Khan et al. | | 455/414.1 |
| 7,155,405 B2 | 12/2006 | Petrovich | | 705/26 |
| 7,194,422 B1 | 3/2007 | Killick | | 705/14 |
| 7,216,109 B1 | 5/2007 | Donner | | 705/64 |
| 7,249,112 B2 | 7/2007 | Berardi et al. | | 705/79 |
| 7,286,818 B2 | 10/2007 | Rosenberg | | 455/414.1 |
| 7,298,271 B2 | 11/2007 | Sprogis | | 340/572.1 |
| 7,308,426 B1 | 12/2007 | Pitroda | | 705/35 |
| 7,330,714 B2 | 2/2008 | Rosenberg | | 455/412.1 |
| 7,349,885 B2 | 3/2008 | Gangi | | 705/41 |
| 7,469,151 B2 | 12/2008 | Khan et al. | | 455/558 |
| 7,469,381 B2 | 12/2008 | Ording | | 715/702 |
| 7,483,858 B2 | 1/2009 | Foran et al. | | 705/39 |
| 7,494,055 B2 | 2/2009 | Fernandes et al. | | 235/380 |
| 7,529,563 B1 | 5/2009 | Pitroda | | 455/558 |
| 7,571,139 B1 | 8/2009 | Giordano et al. | | 705/40 |
| 7,581,678 B2 | 9/2009 | Narendra et al. | | 235/451 |
| 7,613,628 B2 | 11/2009 | Ariff et al. | | 705/14 |
| 7,631,810 B2 | 12/2009 | Liu et al. | | 235/451 |
| 7,693,752 B2 | 4/2010 | Jaramillo | | 705/26 |
| 7,708,198 B2 | 5/2010 | Gangi | | 235/380 |
| 7,712,658 B2 | 5/2010 | Gangi | | 235/380 |
| 7,775,430 B2 | 8/2010 | Lin | | 235/383 |
| 7,805,615 B2 | 9/2010 | Narendra et al. | | 713/186 |
| 7,828,214 B2 | 11/2010 | Narendra et al. | | 235/451 |
| 7,856,377 B2 | 12/2010 | Cohagan et al. | | 705/14.3 |
| 7,864,163 B2 | 1/2011 | Ording et al. | | 345/173 |
| 7,942,337 B2 | 5/2011 | Jain | | 235/492 |
| 7,954,715 B2 | 6/2011 | Narendra et al. | | 235/451 |
| 7,954,716 B2 | 6/2011 | Narendra et al. | | 235/451 |
| 7,954,717 B2 | 6/2011 | Narendra et al. | | 235/451 |
| 7,961,101 B2 | 6/2011 | Narendra et al. | | 340/572.1 |
| 7,967,215 B2 | 6/2011 | Kumar et al. | | 235/492 |
| 7,991,158 B2 | 8/2011 | Narendra et al. | | 380/260 |
| 8,072,331 B2 | 12/2011 | Narendra et al. | | 340/572.1 |
| 8,083,145 B2 | 12/2011 | Narendra et al. | | 235/492 |
| 8,091,786 B2 | 1/2012 | Narendra et al. | | 235/451 |
| 8,131,645 B2 | 3/2012 | Lin et al. | | 705/51 |
| 8,140,418 B1 | 3/2012 | Casey et al. | | 705/35 |
| 8,396,808 B2 | 3/2013 | Greenspan | | 705/64 |
| 8,429,046 B2 | 4/2013 | Pitroda | | 705/35 |
| 8,621,423 B2 * | 12/2013 | Knight | | G06F 8/71 717/106 |
| 8,875,228 B2 * | 10/2014 | Gargiulo | | G06F 21/6218 726/1 |
| 2002/0049631 A1 | 4/2002 | Williams | | 705/14 |
| 2002/0082921 A1 | 6/2002 | Rankin | | 705/14 |
| 2002/0174025 A1 | 11/2002 | Hind et al. | | 705/26 |
| 2002/0179703 A1 | 12/2002 | Allen | | 235/381 |
| 2003/0009382 A1 | 1/2003 | D'Arbeloff et al. | | 705/17 |
| 2003/0083042 A1 | 5/2003 | Abuhamdeh | | 455/406 |
| 2003/0115126 A1 | 6/2003 | Pitroda | | 705/36 |
| 2003/0132298 A1 | 7/2003 | Swartz et al. | | 235/472.02 |
| 2003/0200489 A1 | 10/2003 | Hars | | 714/703 |
| 2004/0073519 A1 | 4/2004 | Fast | | 705/65 |
| 2004/0186768 A1 | 9/2004 | Wakim et al. | | 705/14 |
| 2004/0255291 A1 * | 12/2004 | Sierer et al. | | 717/174 |
| 2005/0004866 A1 | 1/2005 | Bonalle et al. | | 705/39 |
| 2005/0171898 A1 | 8/2005 | Bishop et al. | | 705/39 |
| 2005/0222961 A1 | 10/2005 | Staib et al. | | 705/64 |
| 2005/0234769 A1 | 10/2005 | Jain et al. | | 705/14 |
| 2005/0247777 A1 | 11/2005 | Pitroda | | 235/380 |
| 2006/0287004 A1 | 12/2006 | Fuqua | | 455/558 |
| 2007/0014407 A1 | 1/2007 | Narendra et al. | | 380/259 |
| 2007/0014408 A1 | 1/2007 | Narendra et al. | | 380/270 |
| 2007/0028120 A1 * | 2/2007 | Wysocki et al. | | 713/192 |
| 2007/0198432 A1 | 8/2007 | Pitroda et al. | | 705/64 |
| 2008/0222621 A1 * | 9/2008 | Knight et al. | | 717/151 |
| 2008/0306849 A1 | 12/2008 | Johnson, Jr. et al. | | 705/35 |
| 2009/0108064 A1 | 4/2009 | Fernandes et al. | | 235/380 |
| 2009/0164322 A1 | 6/2009 | Khan et al. | | 705/14 |
| 2010/0087181 A1 * | 4/2010 | Chen et al. | | 455/418 |
| 2010/0241494 A1 | 9/2010 | Kumar et al. | | 705/14.1 |
| 2010/0251231 A1 * | 9/2010 | Coussemaeker et al. | | 717/176 |
| 2011/0073663 A1 | 3/2011 | Narendra et al. | | 235/492 |
| 2011/0171996 A1 | 7/2011 | Narendra et al. | | 455/558 |
| 2011/0223972 A1 | 9/2011 | Narendra et al. | | 455/558 |
| 2011/0231238 A1 | 9/2011 | Khan et al. | | 705/14.26 |
| 2011/0244796 A1 | 10/2011 | Khan et al. | | 455/41.1 |
| 2011/0269438 A1 | 11/2011 | Narendra et al. | | 455/414.1 |
| 2011/0271044 A1 | 11/2011 | Narendra et al. | | 711/103 |
| 2011/0272468 A1 | 11/2011 | Narendra et al. | | 235/492 |
| 2011/0272469 A1 | 11/2011 | Narendra et al. | | 235/492 |
| 2012/0064828 A1 | 3/2012 | Khan et al. | | 455/41.1 |
| 2012/0102479 A1 * | 4/2012 | Smith et al. | | 717/171 |
| 2012/0109764 A1 | 5/2012 | Martin et al. | | 705/17 |
| 2012/0323664 A1 | 12/2012 | Klems | | 705/14.26 |
| 2013/0111546 A1 | 5/2013 | Gargiulo et al. | | 726/1 |
| 2013/0132771 A1 * | 5/2013 | Pan et al. | | 714/15 |
| 2014/0082056 A1 * | 3/2014 | Gargiulo | | H04L 9/00 709/203 |
| 2014/0164475 A1 * | 6/2014 | Gargiulo | | H04L 9/32 709/202 |
| 2014/0215639 A1 * | 7/2014 | Gargiulo | | 726/28 |
| 2014/0298322 A1 * | 10/2014 | Gargiulo et al. | | 717/175 |
| 2014/0351806 A1 * | 11/2014 | Gargiulo | | 717/170 |
| 2015/0012921 A1 * | 1/2015 | Lettow | | H04W 4/003 718/102 |
| 2015/0181418 A1 * | 6/2015 | Gargiulo | | H04W 8/24 455/414.2 |

FOREIGN PATENT DOCUMENTS

| | | |
|---|---|---|
| EP | 0 766 852 B1 | 8/2004 |
| EP | 1 412 890 A4 | 11/2004 |
| EP | 1 477 943 A2 | 11/2004 |
| KR | 10-0653280 B1 | 12/2006 |
| KR | 10-1081956 B1 | 11/2011 |
| WO | WO 01/18629 A3 | 3/2001 |
| WO | WO 03/012717 A1 | 2/2003 |
| WO | WO 2010/111148 A2 | 9/2010 |

* cited by examiner

SYSTEMS, METHODS, AND COMPUTER PROGRAM PRODUCTS FOR MANAGING SERVICE INSTALLATION

CROSS REFERENCE TO RELATED APPLICATIONS

This application claims priority to U.S. Provisional Application Nos. 61/805,413 and 61/889,405, filed Mar. 26, 2013 and Oct. 10, 2013, respectively, the contents of which are incorporated herein by reference.

BACKGROUND

1. Field

The present invention generally relates to mobile devices for use in mobile commerce, and more particularly to systems, methods, and computer program products for installing a service on a mobile device.

2. Related Art

In a mobile commerce environment, service provider transactions, accounts, products and the like often are stored and processed in a mobile wallet application on a client (e.g., customer) mobile device. A service provider (SP) is a company, organization, entity, or the like, that provides services to customers or consumers. Examples of service providers include account-issuing entities such as banks, merchants, card associations, marketing companies, and transit authorities. A service may be, for example, an applet, application, set of applications or set of code providing an activity, capability, functionality, work, or use permitted or provided by a service provider, such as a payment service, credit, debit, checking, gift, offer or loyalty service, transit pass service, and the like.

Services corresponding to respective service providers may be stored on a mobile device. For example, a service offered by a service provider (e.g., a bank) may be enabled on a mobile device in order to conduct a transaction using that service and/or credential. A customer may then use the mobile device to conduct a transaction, such as a contactless payment, at a point-of-sale, although numerous other transactions or interactions are also possible.

Often, service providers release multiple versions of services. For example, new versions of a service may be released to incorporate updates or changes, fix bugs in previous versions, or apply a security patch. Moreover, multiple versions of a service may be required for new or different types of mobile devices and/or secure elements on the mobile devices.

Nevertheless, difficulties can arise in the context of compatibility between service versions and secure elements. For example, a service version which is inappropriate for a particular type of secure element may function less efficiently, incorrectly, or not at all. These problems are exacerbated as the number and types of mobile devices, secure elements and service versions continue to grow and change.

Therefore, one technical challenge involves dynamically determining, in an efficient and effective manner, which version of a service to install on a particular mobile device or secure element. Another technical challenge involves determining the most efficient installation of a new service when needed, in order to reduce the use of resources or storage of code on a secure element.

BRIEF DESCRIPTION

The present invention provides systems, methods, and computer program products for installing a service on a secure element.

In one embodiment, installation of services on a secure element having a secure element profile is managed. A request to install a service on the secure element is received. There is a determination of a preferred version of the service corresponding to the secure element profile of the secure element. There is also a determination of an existing version of the service loaded on the secure element. Using a rules engine, there is a determination of whether to install on the secure element either the existing version of the service or the preferred version of the service. Command(s) is/are transmitted to either (a) install the existing version of the service or (b) load and install the preferred version of the service, based on the determination using the rules engine.

BRIEF DESCRIPTION OF THE DRAWINGS

The features and advantages of the example embodiments of the invention presented herein will become more apparent from the detailed description set forth below when taken in conjunction with the following drawings.

DETAILED DESCRIPTION

I. System

The example embodiments of the invention presented herein are directed to systems, methods, and computer programs products for installation of services on a secure element, which are now described herein in terms of an example system in a mobile commerce environment. This is for convenience only and is not intended to limit the application of the present invention. In fact, after reading the following description, it will be apparent to one skilled in the relevant art(s) how to implement the following invention in alternative processes such as service deletion, upgrading, and the like.

Figure 1:
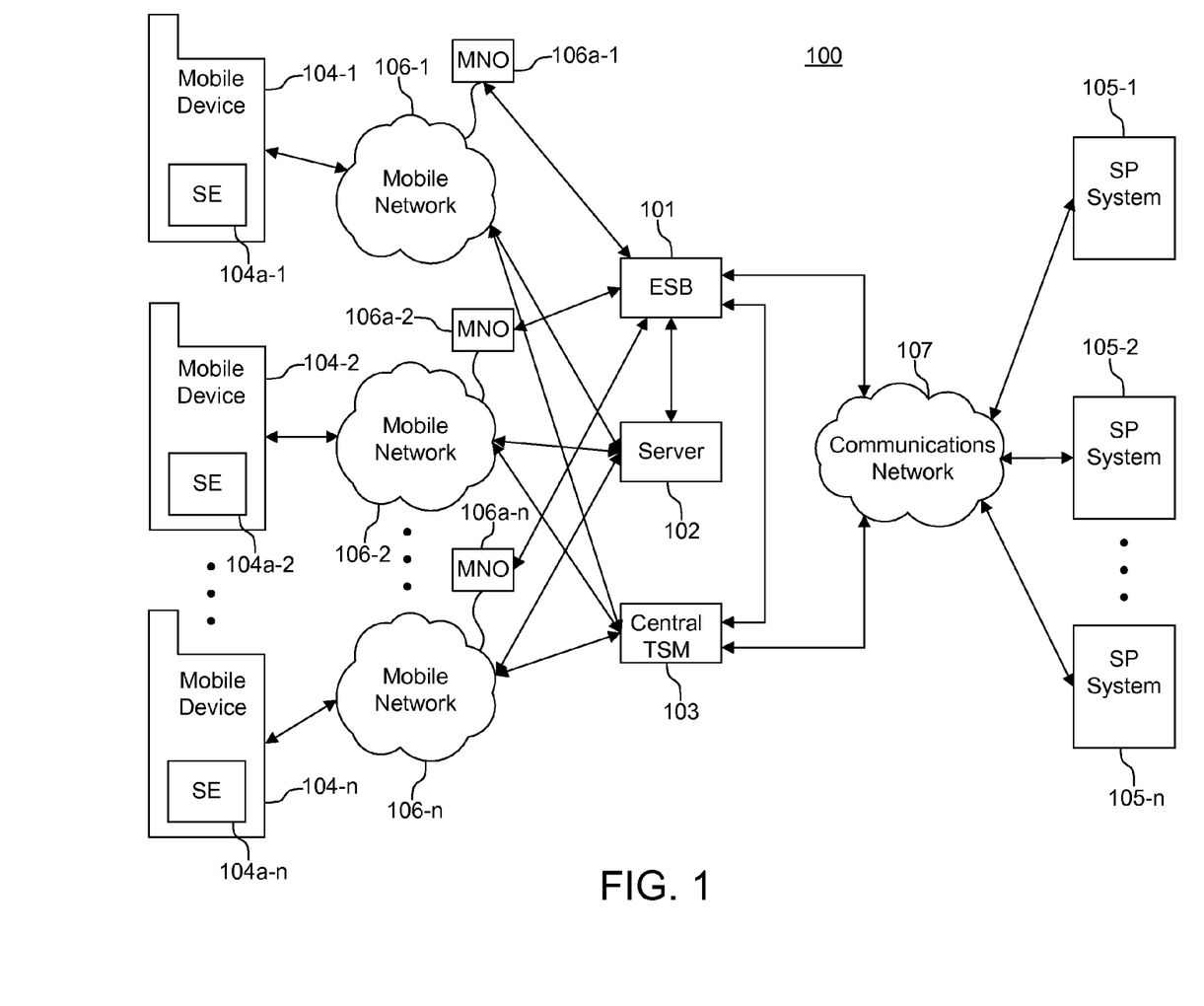
FIG. 1 is a diagram of a system for installing a service according to an example embodiment.

FIG. 1 is a diagram of a system 100 for installing a service according to an example embodiment.

As shown in FIG. 1, system 100 includes an enterprise service bus (ESB) 101, which is communicatively coupled to a server 102 (which may also be referred to as a "wallet server" or "mobile wallet server") and a central trusted service manager (TSM) 103.

ESB 101 manages interactions between service provider systems and mobile devices, and grants the service provider systems the ability to efficiently and securely communicate with the mobile devices in order to, for example, set up (e.g., install) a service account or transmit a message, without the need for directly communicating with each mobile device. In an example embodiment, the ESB 101 is hardware and/or software that is implemented to serve as an intermediary between SP systems 105, wallet server 102, central TSM 103 and mobile devices 104, for example, for provisioning service accounts in mobile wallets and managing events.

The wallet server 102 and the central TSM 103 are each communicatively coupled to mobile devices 104-1, 104-2, ..., 104-n (collectively "104") via corresponding mobile networks 106-1, 106-2, ..., 106-n (collectively "106"). Each of the mobile devices 104 includes a corresponding secure element 104a-1, 104a-2, ..., 104a-n (collectively "104a"). Each of the mobile devices 104 may include a user interface such as a display (not shown). Each of the mobile networks 106 is operated by a corresponding MNO 106a-1, 106a-2, . . . , 106a-n (collectively "106a").

Central TSM 103 is typically an independent entity serving MNOs and account-issuing service providers by provisioning services and applications, such as contactless applications associated with the service providers, on mobile devices. Typical TSMs can distribute and manage the contactless applications remotely because they have access to secure elements (SEs) in near field communication (NFC) enabled mobile devices.

In one example embodiment, a service provider (e.g., service provider 105-1) may transmit a request to the central TSM 103 to install a service (e.g., one or more applets) on a secure element (e.g., secure element 104a-1). In response, the central TSM 103 may install the service on the secure element 104a-1, by generating at least one service provider security domain including corresponding temporary or permanent security keys, if required, and/or instantiating the service on the secure element.

Generally, service instantiation includes creating an instance of an uninstantiated applet on a secure element and extraditing that instance to a security domain on a secure element. Installing and/or instantiating a service on a secure element are described in more detail in U.S. patent application Ser. No. 13/653,145 entitled "Systems, Methods, and Computer Program Products for Managing Secure Elements", which is hereby incorporated by reference in its entirety.

According to example embodiments herein, central TSM 103 also stores a database or "rules engine" (shown in FIG. 3) which indicates, for one or more types of secure element profiles (or "SE profiles"), which versions of particular services, applets, and the like are preferred and/or otherwise eligible. For example, a secure element (e.g., secure element 104a-1) can be pre-populated with a set of applications, and upon central TSM 103 receiving a request to activate a service, originated from a wallet client/issuer, central TSM 103 can query a database for a secure element profile that defines acceptable and preferred service versions for the secure element. In other words, the service version is the application layout, i.e., a version profile of the applications. If the secure element profile on a handheld or mobile device (e.g., mobile device 104-1), communicated to central TSM 103 either by the wallet client or stored in a database, does not correspond to an acceptable version, central TSM 103 deletes and installs the necessary applications to make it acceptable. The nature and usage of the rules engine and these processes will be described more fully below with respect to FIGS. 2 and 3.

The terms applet, application, service and/or the plural form of these terms are used interchangeably herein to refer to an applet (functioning independently or in conjunction with other applets) or set or subset of instructions or code, which when executed by one or more processors (e.g., in a mobile device, secure element, card reader, terminal, point of sale (POS) system, or server) causes the processor(s) to perform specific tasks. It should be understood that an applet as used herein refers to generic or instances of that applet on a secure element.

The wallet server 102 and the central TSM 103 communicate with mobile devices 104 via the mobile networks 106, using security protocols such as GlobalPlatform secure channel protocol, SSL, TLS, or the like. Mobile networks 106 may be mobile device cellular networks, radio networks, or the like.

The ESB 101 is communicatively coupled to service provider (SP) systems 105-1, 105-2, . . . , 105-n (collectively "105") via a communications network 107. A service provider system (i.e., service provider) transmits a request to central TSM 103 to install a service version in a mobile wallet. The request may be self-prompted by the service provider or may be sent in response to a prompt from the mobile wallet. An on-card representative component of the mobile wallet (e.g., a wallet client application) may also be stored in a secure element 104-n of a mobile device 104 to communicate with a mobile wallet on the mobile device 104, and may include instructions which, when executed by the processor of the mobile device, interface the mobile wallet with other devices on the system, and provide necessary data to the user via the interface of the mobile device. Communications network 107 may be a virtual private network (VPN), a network using Hypertext Transfer Protocol (HTTP) standards, or the like.

II. Process

Figure 2:
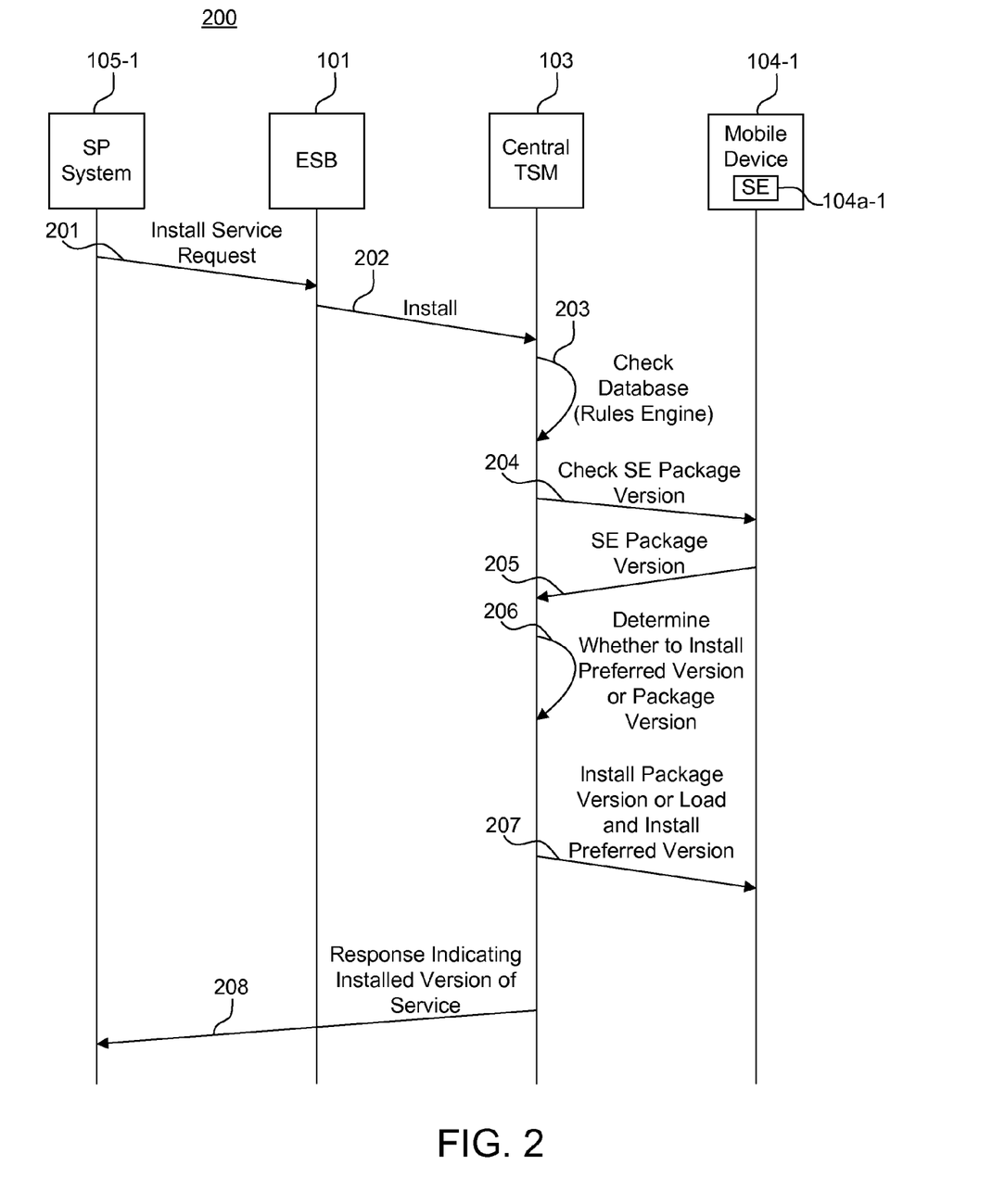
FIG. 2 is a sequence diagram illustrating a sequence for installing a service version according to an example embodiment.

FIG. 2 is a sequence diagram illustrating a sequence for installing a service version according to an example embodiment. In the following description, references to elements (e.g., service provider 105-1, ESB 101) refer to those elements in FIG. 1. The processes described below with reference to FIG. 2 will also be described in further detail with respect to FIG. 3.

Briefly, as shown in FIG. 2, service provider 105-1 transmits an install service request to ESB 101, requesting to install a service on the secure element 104a-1 of mobile device 104-1. In step 202, ESB 101 instructs the central TSM 103 to begin the installation process. In step 203, central TSM 103 checks a database or rules engine stored thereon to determine which version of the requested service is preferred for the secure element profile corresponding to secure element 104a-1. In step 204, central TSM 103 communicates with mobile device 104-1 to determine which package version of the requested service is loaded in secure element 104a-1. Details of the package version will be described below with respect to FIG. 3. In step 205, mobile device 104-1 responds to central TSM 103 with the package version of the service loaded in mobile device 104-1. In step 206, central TSM 103 determines whether to install the loaded package version of the service or the preferred version of the service. In step 207, central TSM 103 transmits a command based on the determination in step 206 to mobile device 104-1 to install the loaded package version or the preferred version.

As an additional aspect of the example embodiment, in the example shown in FIG. 2, a response indicating the installed version of the service is transmitted in step 208 from central TSM 103 to the service provider 105-1 associated with the service request. Thus, the request to install a service is received at the central TSM 103 from the service provider 105-1 associated with a service, and the central TSM 103 transmits a response indicating the installed version of the service to the associated service provider 105-1.

According to the response received from central TSM 103 in step 208, the service provider 105-1 may, for example, generate one or more scripts for personalizing the service and installing credentials for the service based on the response. In particular, a new or different version may require a different personalization script. For example, a card issuer (not shown) or service provider may need to know which version of a payment applet is installed before generating a personalization script, and may therefore wait for an install service response from the central TSM 103, including a service ID and new version, to create a personalization script. To that end, the central TSM 103 might also create a mapping between service version and applet versions for a service provider or issuer.

Figure 3:
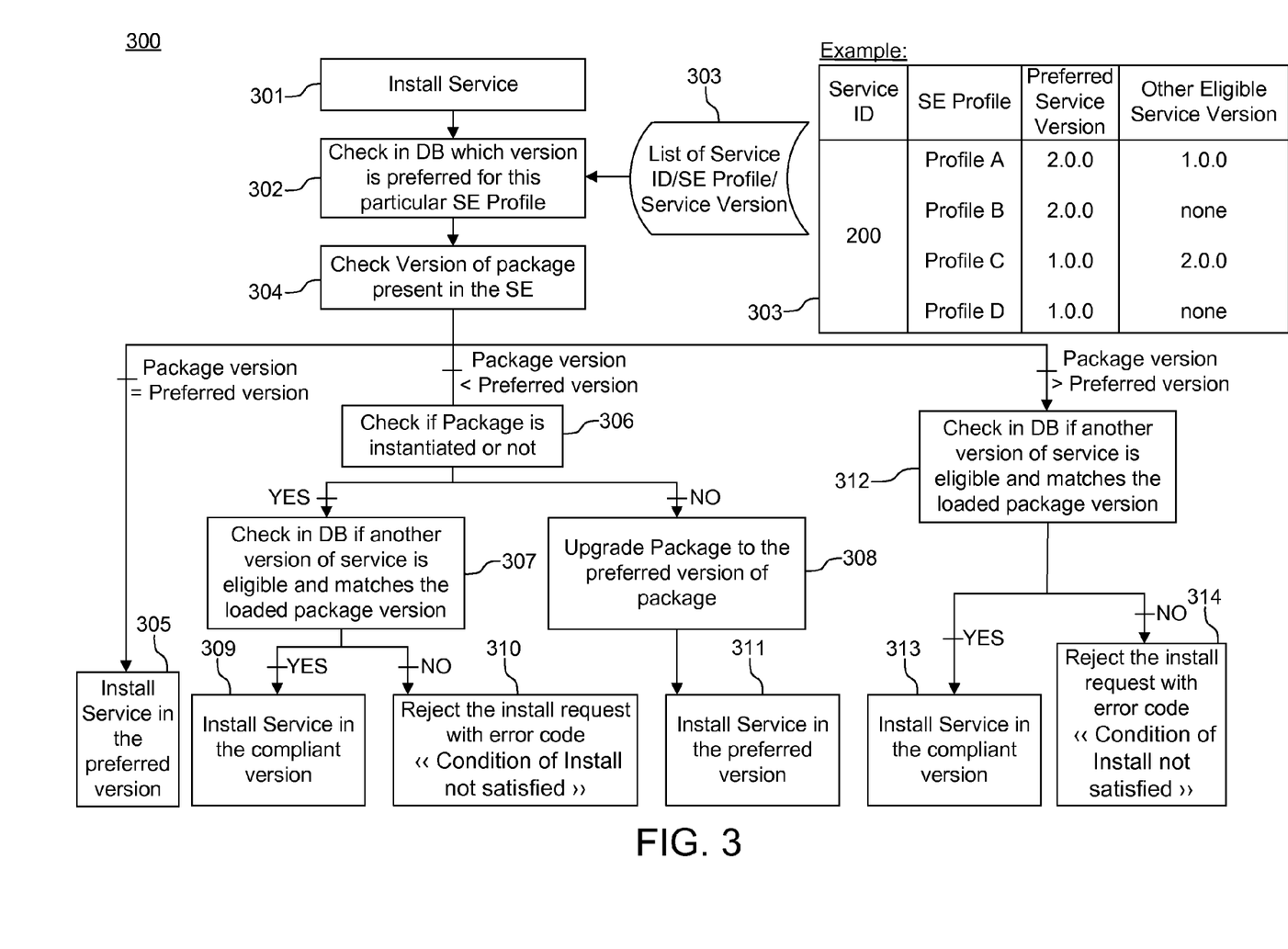
FIG. 3 is a flow diagram illustrating a process for installing a service version according to an example embodiment.
Figure 4:
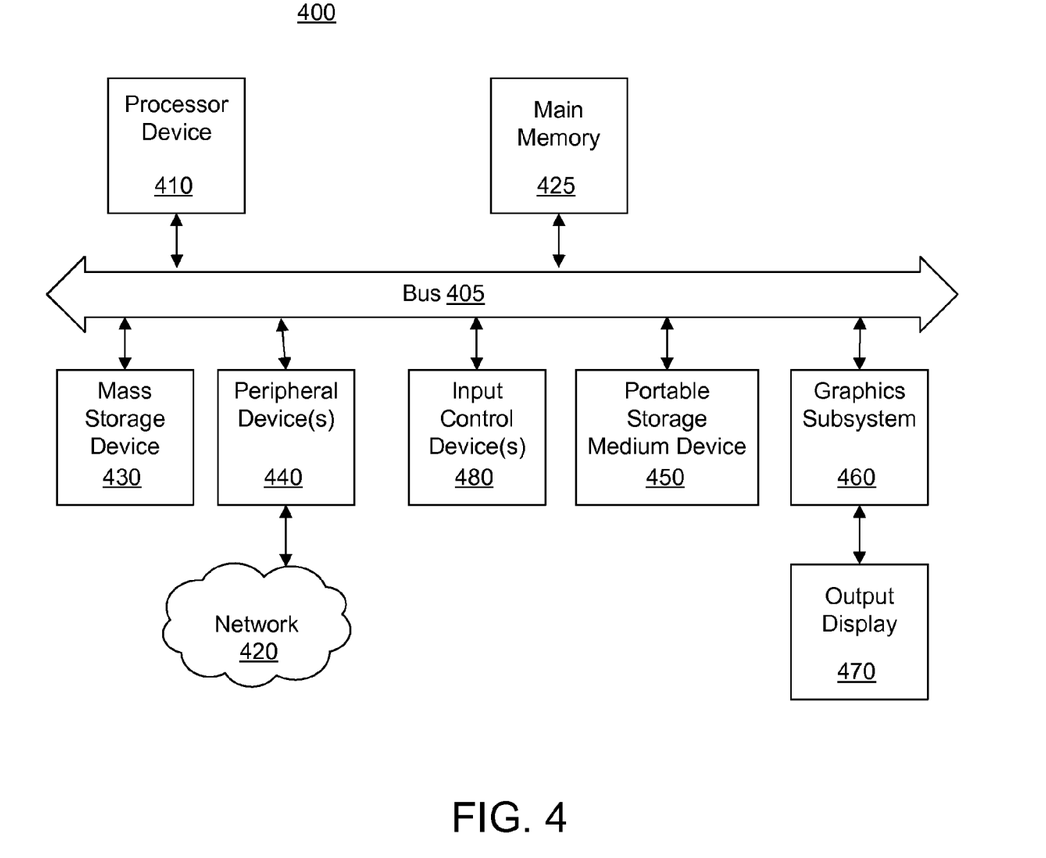
FIG. 4 is a block diagram of an example system useful for implementing the present invention.

FIG. 3 is a flow diagram illustrating a process for installing a service version according to an example embodiment.

Briefly, according to FIG. 3, installation of services on a secure element having a secure element profile is managed by a central TSM (e.g., FIG. 1, central TSM 103). A request to install a service on the secure element is received by the central TSM. The central TSM determines a preferred version of the service corresponding to the secure element profile of the secure element. The central TSM also determines an existing version of the service loaded on the secure element and, for example, whether the service is already used or not. Using a rules engine, the central TSM determines whether to install on the secure element either the existing version of the service or the preferred version of the service. A command is transmitted from the central TSM to either (a) install the existing version of the service or (b) load and install the preferred version of the service, based on the determination using the rules engine.

In more detail, in step 301, installation of a service is instructed. For example, a service provider (e.g., service provider 105-1) may instruct the central TSM 103 to install a service on a secure element (e.g., secure element 104-1). The instruction may be generated in response to a user request, such as a user request to install a bank applet on the user's mobile device.

In step 302, central TSM 103 checks a "rules engine" 303, which may be stored on a database or memory, to determine which version of an applet is preferred for a particular secure element profile, in this example for the secure element 104a-1. A secure element profile may contain or indicate information about a corresponding secure element including, for example, model information, processing and memory capabilities, and applications installed or pre-installed on the secure element.

As shown in FIG. 3, rules engine 303 includes a list of correspondences between a service ID (the ID of service requested to be installed), the secure element profile (e.g., characteristics of the secure element on which the service is to be installed), and different service versions including preferred and other eligible service versions. Thus, in the example shown in FIG. 3, the service ID of the service instructed to be installed is service ID 200. For this service, there are four secure element profiles eligible to have the service installed on, and the rules engine 303 stores a preferred service version of the service for each secure element profile, along with any other eligible service versions for that secure element profile (if any). Thus, rules engine 303 includes a list of preferred versions of a service corresponding to specific secure element profiles.

As shown in FIG. 3, for example, for secure element profile "A", the preferred service version of service 200 is 2.0.0, but another eligible service version is 1.0.0. Meanwhile, for secure element profile "B", the preferred service version of service 200 is also 2.0.0, but there is no other eligible service version. Thus, in this example, a secure element with secure element profile B can only install version 2.0.0 of service 200; other versions are not eligible.

In more detail, a secure element profile defines specific hardware and software features of a given secure element. For example, a secure element with profile "C" may contain 200 kB of memory, whereas a secure element with profile "D" may only contain 100 kB of memory. In the case of profile "D", it may be more desirable to use a service version that loads a less fully featured application that requires less memory. In another example, secure elements from different vendors may not behave in the same way, and as a consequence might require a specific service version for a given service in order to be compatible with the target secure element. In some examples, the secure element profiles are dependent in some way on, for example, a type of payment application and/or a particular device and/or a particular MNO.

One example of a secure element profile, including fields and descriptions of information of the secure element profile, is shown below. It should be understood that the following is simply an example, and that a secure element profile might contain more, fewer, or different fields.

| FIELD | DESCRIPTION |
| --- | --- |
| SE Profile Name | Name of secure element profile (e.g., UICC_01_P01001) |
| SE Profile Version | Version number of secure element profile |
| Applet A Version | Version of an applet named Applet A |
| Applet B Version | Version of another (different) Applet named Applet B |
| Applet C Version | Version of another (different) Applet named Applet C |
| Contactless Applet Version | Version of applet for contactless transactions (e.g., contactless payment) |
| Payment Applet A Version | Version of applet for payment transactions |
| Payment Applet B Version | Version of another (different) applet for payment transactions named Payment Applet B |
| Payment Applet C Version | Version of another (different) applet for payment transactions named Payment Applet C |
| Secure Element Manufacturer | Identity of manufacturer of secure element |
| Secure Element Form Factor | e.g., Universal Integrated Circuit Card, (UICC), embedded |
| Secure Element Pre-personalization | e.g., an identity of a pre-set personalization of the secure element corresponding to the secure element manufacturer |
| Mobile Network Operator (MNO) | Carrier or mobile operator corresponding to a mobile device having a secure element |
| SE Part Number | Part number corresponding to the secure element (e.g., the manufacturer's part number) |
| SE Manufacturer Version | Manufacturer version number corresponding to the secure element, e.g., GP 2.2.1, UICC Configuration v1.0.1, Amendment A, Amendment B, and Amendment C (CGM not supported) |
| JavaCard version | Version number corresponding to the JavaCard, e.g., Javacard 2.2.2, parts of 3.0.1 for deselect, and Iso & Contactless interface management |
| Available volatile memory space limit | Total amount of volatile memory space available, e.g., 13.5k/18k (total incl. OS 30k) |
| Available non-volatile memory space limit | Total amount of non-volatile memory space available, e.g., 184k/256k |
| Volatile memory assigned at manufacture to trusted security domain | e.g., volatile memory assigned at manufacturer to the trusted security domain for the system described herein |
| Non-volatile memory assigned at manufacture to trusted security domain | e.g., non-volatile memory assigned at manufacturer to the trusted security domain for the system described herein |
| Platform Certificate Number (PCN) | e.g., PCN0012 |
| PCN expiration date | e.g., 14 Feb. 2012 |

Other fields might include, for example, OS version, GlobalPlatform version, extra capabilities of the secure element (e.g., on-board key generation), pre-loaded applications and versions, etc.

As mentioned above, rules engine 303 includes a list of correspondences between a service ID (the ID of service requested to be installed), the secure element profile (e.g., characteristics of the secure element on which the service is to be installed), and different service versions including preferred and other eligible service versions.

According to the embodiment, the rules in the rules engine are configurable dynamically, e.g., "on the fly". In other words, the rules can be entered in real time while the computer system is in production. Thus, the rules are not themselves a part of a compiled workflow or computer program, as is conventionally done. In other words, the rules in the rules engine are not hard-coded in the central TSM. The entered rules are processed by the rules engine which then provides a result to a workflow about what to do regarding an installation of a service or applet on the secure element. Accordingly, the rules engine is configurable dynamically in real-time or pseudo-real-time with relation to the installation process.

Moreover, because the central TSM 103 "checks" the rules engine 303 at different stages of the process as described below, there is less need to (or no need whatsoever to), for example, hard-code specific versions to remove or install at the secure element for every different secure element, types of applets or service version, card vendor, etc.

In one example, the rules for a rules engine may be determined by a service provider or partners thereof (e.g., card vendors) for different types of secure elements, and transmitted to central TSM 103 for inclusion in the rules engine. For example, a user interface may be provided for a service provider with, e.g., drop-down lists for additions or deletions of service versions, secure element profiles, and other rules, along with a save function to save any changes or additions.

In step 304, central TSM 103 checks for the version of the service package present in the secure element at issue (e.g., secure element 104*a*-1). Put another way, central TSM 103 communicates with the secure element 104*a*-1 or simply checks its own database to determine what version of the service, if any, is loaded as a "package version" on the secure element 104*a*-1.

In the case where central TSM 103 checks its own database, communication with the secure element 104*a*-1 might not be necessary. In particular, in some cases, central TSM 103 may already be aware of the content of a secure element, even if there has not been an exchange between the two. For example, in some embodiments, secure elements and corresponding secure element profiles are pre-provisioned on central TSM 103 before they are issued for use in the field. In such cases, central TSM 103 would already have the related information stored in a database.

A secure element may often have a loaded generic service ("package service"), but an instance of the package service might not yet be installed.

In that regard, generally, a secure element may include security domains, code, applets, and packages. Applets on the secure element may be in uninstantiated or instantiated form, and uninstantiated applets may be preloaded on a secure element during manufacture of the secure element. Alternatively, applets may be loaded, for example, OTA after a secure element has been manufactured (e.g., upon delivering the secure element to a user).

Applets may be generic or non-generic. Non-generic applets may include couponing and loyalty applets, and/or any applet that is not generic to multiple service providers. That is, a non-generic applet may correspond to a single service provider. Data that may be used and/or associated with a non-generic applet (e.g., offers, coupons) may be stored in the secure element or in memory outside of the secure element (e.g., non-volatile memory of a mobile device). Generic applets may include applets that, when instantiated, can be used by multiple service providers. For example, a generic applet of a payment network (e.g., MasterCard®) may be instantiated for multiple service providers by a central TSM, and therefore may be used by more than one service provider.

Uninstantiated applets may subsequently be instantiated, and each instance may then be extradited to a corresponding security domain. Instantiation may include personalizing applets by using data corresponding to the entity for which the instance is being generated or data corresponding to an end-user or customer of the service. In addition, multiple instances of an uninstantiated applet may be generated for different entities (e.g., service providers) and each instance may be extradited to a different security domain for use by a different entity. It should be understood that installing a service may include the instantiation and extradition of a service on a secure element.

Thus, in step 304, central TSM 103 checks for the package version of the service present in the secure element 104*a*-1.

After step 304, the process proceeds based on a comparison between the existing package version, and the preferred version for secure element 104*a*-1 shown and stored in rules engine 303. Generally, if the existing package version is equal to the preferred package version, then the package version of the service (which is the same as the preferred version) is installed. If the existing package version is not eligible for the service or somehow less desired, the preferred version of the service is loaded, and then installed. The determination of whether an existing version of a service is eligible for a service, in turn, is based on the rules engine. For example, the determination of whether or not to install a new version of a service may be based on a secure element profile, including at least some of the values associated with the secure element profile. Details of each decision will now be described with respect to steps 305 to 314.

Specifically, if the package version of the service is equal to the preferred version, then the package version is also the preferred version. Accordingly, the process proceeds to step 305 to simply install the loaded service as the preferred version (i.e. the package version).

On the other hand, if the package version is older, lower, or otherwise less desired than the preferred version, the process proceeds to step 306 to determine whether the loaded package version has already been instantiated and/or installed on the secure element. If the package version has been instantiated and/or installed, the process proceeds to step 307. If the package version has not been instantiated and/or installed, the process proceeds to step 308.

In step 307 (the package version has been instantiated), central TSM 103 checks the database to determine whether the instantiated package version is eligible for the service and matches the loaded package version. In particular, even though in this case the package version is not the preferred version, central TSM 103 still consults the rules engine 303 to determine whether the version currently instantiated on the secure element 104*a*-1 is one of the "Other Eligible Service Version". If there is a match to one of the eligible service versions, the process proceeds to step 309, whereas if the package version does not match any eligible service version, the process proceeds to step 310.

In step 309, the compliant package version of the service, which is an eligible service version, is installed at the secure element 104*a*-1. Thus, the secure element 104*a*-1 is provided with a version which is eligible and compliant with the service requested to be installed thereon. At the same time, by refusing to automatically upgrade to the preferred version in this situation, it is possible to avoid forcing an upgrade in every secure element based on a single service provider's request.

On the other hand, if it is determined in step 310 that no other eligible version matching the loaded package version exists in the database, the install request is rejected, and an error code is issued (e.g., "Condition of install not satisfied"). Thus, central TSM 103 can report an error if a service to be installed is not eligible to be installed on the secure element 104a-1. As a result, it is possible to avoid forcing an upgrade of a service that is shared between multiple instances of that service.

On the other hand, in some embodiments, multiple instances of a service might be allowed on the same secure element. In that regard, whether or not to allow multiple versions of a service on the same secure element can be configurable in the rules engine. For example, based on available memory space and/or the nature of the service, the rules engine may indicate that a preferred version can be installed beside an existing used version which is different.

Returning to step 306, if the package version is not instantiated in the secure element 104a-1 (i.e., the secure element 104a-1 has never created an instance of this particular service before), the process proceeds to step 308, where the secure element 104a-1 loads the preferred version and upgrades the package version to the preferred version. In one example, a command from central TSM 103 includes instructions to remove the existing package version of the service from the secure element 104a-1. In particular, and as discussed above, in some cases only one version of a service may be permitted on a secure element 104a-1 at one time, while at other times multiple versions of a service may be permitted. Moreover, whether multiple instances are allowed may be configurable with the rules engine In step 311, the preferred version of the service is installed in the secure element 104a-1.

Returning to step 304, a third condition may occur in which the package version is better, newer, greater than, or otherwise desired over the "preferred" version. In such a case, central TSM 103 still needs to verify that the package version is eligible for the service being requested to be installed. Thus, the process proceeds to step 312, where central TSM 103 checks rules engine 303 to determine if another version of the service is eligible and matches the loaded package version. If so, the process proceeds to step 313, where the service is simply installed in the compliant package version. On the other hand, if no other eligible version matching the loaded package version exists in the rules engine, the install request is rejected, and an error code is issued (e.g., "Condition of install not satisfied").

III. Computer Readable Medium Implementation

The example embodiments described above such as, for example, the systems and procedures depicted in or discussed in connection with FIGS. 1 to 4, or any part or function thereof, may be implemented by using hardware, software or a combination of the two. The implementation may be in one or more computers or other processing systems. While manipulations performed by these example embodiments may have been referred to in terms commonly associated with mental operations performed by a human operator, no human operator is needed to perform any of the operations described herein. In other words, the operations may be completely implemented with machine operations. Useful machines for performing the operation of the example embodiments presented herein include general purpose digital computers or similar devices.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a non-transitory storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD or CD-ROM, a micro drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the non-transitory computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further includes software for performing example aspects of the invention, as described above.

Included in the programming and/or software of the general and/or special purpose computer or microprocessor are software modules for implementing the procedures described above.

While various example embodiments of the invention have been described above, it should be understood that they have been presented by way of example, and not limitation. It is apparent to persons skilled in the relevant art(s) that various changes in form and detail can be made therein. Thus, the disclosure should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A system to manage installation of services on secure elements having secure element profiles, comprising:
   at least one memory including a rules engine; and
   a processor coupled to the at least one memory, the processor being operable to:
      receive a request to install a service on a secure element comprising a secure element profile, the request comprising a service identifier identifying the service;
      access a rules engine providing a correspondence between the service identifier, a secure element profile, and an indication of a preferred version of the service;
      determine, using the rules engine, the preferred version of the service corresponding to the secure element profile of the secure element;
      determine an existing version of the service already loaded but not installed in the secure element;
      determine, if the preferred version of the service is the same as the existing version of the service, to install the existing version of the service on the secure element and, if the preferred version of the service is not the same as the existing version of the service, to install the preferred version of the service on the secure element; and
      transmit a command to the secure element, the command comprising instructions either to (a) install the existing version of the service on the secure element or (b) load and install the preferred version of the service on the secure element, in accordance with the determination regarding whether or not the preferred version of the service is the same as the existing version of the service.

2. The system according to claim 1,
   wherein the request to install a service is received from a service provider associated with the service; and
   wherein the processor is further operable to transmit a response indicating the installed version of the service to the associated service provider.

3. The system according to claim 2, wherein the service provider generates one or more scripts to personalize the service and to install credentials for service based on the response.

4. The system according to claim 1, wherein the rules engine includes a list of preferred versions of a service corresponding to specific secure element profiles.

5. The system according to claim 4, wherein the rules engine is configurable dynamically in real-time or pseudo-real-time.

6. The system according to claim 1, wherein the command includes instructions to remove the existing version of the service from the secure element if the preferred version is different from the existing version.

7. The system according to claim 1, wherein the secure element profile comprises information about the corresponding secure element including model information, processing and memory capabilities, and applications loaded on the secure element.

8. The system according to claim 1, wherein the processor is further operable to report an error if the service to be installed is not eligible to be installed on the secure element.

9. The system according to claim 8, wherein the determination of eligibility is based on the rules engine.

10. The system according to claim 1, wherein the service includes one or more applets.

11. A method for managing installation of services on a secure element having a secure element profile, the method comprising:
    receiving a request to install a service on the secure element;
    determining a preferred version of the service corresponding to the secure element profile of the secure element;
    determining an existing version of the service already loaded on the secure element but not installed;
    determining, using a rules engine, whether to install on the secure element either the existing version of the service or the preferred version of the service; and
    transmitting a command to delete the existing version of the service and load and install the preferred version of the service, based on the determination using the rules engine.

12. The method according to claim 11, wherein the request to install a service is received from a service provider associated with the service, and wherein the processor is further operable to transmit a response indicating the installed version of the service to the associated service provider.

13. The method according to claim 12, wherein the service provider generates one or more scripts for personalizing the service and installing credentials for service based on the response.

14. The method according to claim 11, wherein the rules engine includes a list of preferred versions of a service corresponding to specific secure element profiles.

15. The method according to claim 14, wherein the rules engine is configurable dynamically in real-time or pseudo-real-time.

16. The method according to claim 11, wherein the rules engine includes instructions to remove the existing version of the service from the secure element.

17. The method according to claim 11, wherein a secure element profile comprises information about a corresponding secure element including model information, processing and memory capabilities, and applications loaded on the secure element.

18. The method according to claim 11, further comprising reporting an error if the service to be installed is not eligible to be installed on the secure element.

19. The method according to claim 18, wherein the determination of eligibility is based on the rules engine.

20. The method according to claim 11, wherein the service includes one or more applets.

21. A non-transitory computer-readable medium having stored thereon sequences of instructions for causing one or more processors to:
    receive a request to install a service on a secure element;
    determine a preferred version of the service corresponding to a secure element profile of the secure element;
    determine an existing version of the service already loaded on the secure element but not installed;
    determine, using a rules engine, whether to install on the secure element either the existing version of the service or the preferred version of the service; and
    transmit a command to install the existing version of the service based on the determination using the rules engine.

22. The computer-readable medium according to claim 21, wherein the request to install a service is received from a service provider associated with the service, and wherein the processor is further operable to transmit a response indicating the installed version of the service to the associated service provider.

* * * * *